United States Patent Office 3,567,378
Patented Mar. 2, 1971

3,567,378
RECOVERY OF MAGNESIUM VALUES FROM MAGNESIUM AND SULFATE CONTAINING AQUEOUS SALT SOLUTIONS
Lockwood W. Ferris, deceased, late of Salt Lake City, Utah, by Tracy Collins Bank and Trust Company, trustee, Salt Lake City, Utah, assignor to National Lead Company, New York, N.Y.
No Drawing. Filed Sept. 18, 1967, Ser. No. 668,711
Int. Cl. C01d 5/00; C01f 5/10, 5/32
U.S. Cl. 23—201                                    8 Claims

ABSTRACT OF THE DISCLOSURE

A process for recovering magnesium values from aqueous salt solutions containing magnesium and sulfate ions, comprising the addition thereto of sufficient alkali metal chloride salts, specifically sodium and/or potassium chloride, to provide for conversion of all of the magnesium values to magnesium chloride and also to provide sufficient alakli metal ion to combine with the sulfate vide sufficient alkali metal ion to combine with the sulfate the presence of steam at about 500–750° C., preferably 600–700° C., to convert the magnesium chloride values to magnesium oxide with evolution of hydrogen chloride, water washing the calcinate to solubilize the soluble salts including salts of sodium, potassium, lithium and boron, and separating the magnesium oxide from the solubilized salts. The magnesium oxide obtained in this way is of high purity and may be reacted with hydrochloric acid, such as that evolved from this process, to produce high purity magnesium chloride for use in the electrolytic production of magnesium metal.

---

Reference is made to my related co-pending applications Ser. Nos. 400,994 and 668,737 which have issued respectively as Pats. Nos. 3,432,258 and 3,432,031.

This invention pertains to the selective recovery from aqueous salt solutions containing chlorides and/or sulfates of sodium, potassium, magnesium, etc., for recovering the magnesium values as magnesium oxide in a highly purified state. The invention is more particularly concerned with the selective recovery of such magnesium values from naturally occurring brines of the character aforesaid, as found in oceans, inland seas, salt lakes, wells, and the like, disposed about the earth's surface.

Such brines, in general, contain sodium chloride as the major constitutent, together with lesser but nevertheless significant amounts of the chlorides and/or sulfates of potassium and magnesium as the principal remaining salts, together with smaller amounts of salts of other metals, such as lithium, boron, etc.

Normal solar evaporation of sea water brines or of brines similar in composition to those of the Great Salt Lake in Utah, results, after precipitation of the bulk of the sodium and potassium salts, in a brine that is rich in magnesium chloride, but containing too high a concentration of sulfate to permit of its use as a magnesium chloride cell feed in electrolysis cells for the electrolytic recovery of metallic magnesium. The problem, then, is to eliminate this sulfate, or at least to reduce its concentration to a limit acceptable for magnesium chloride electrolytic cell feed, while at the same time eliminating residual amounts of other salts such as those of sodium, potassium, lithium and boron. The sulfate content can be reduced, but not eliminated entirely, by precipitation as calcium sulfate upon the addition of calcium chloride, but this process has a number of disadvantages.

Basically, the concept of the present invention involves transformation of the magnesium content of solar evaporated magnesium chloride bitterns, into the insoluble magnesium oxide while leaving the sulfate content, as well as that of other cations, such as sodium, potassium, lithium and boron, in a soluble form. In this way, the interfering elements can be removed by washing to yield a refined magnesium oxide which can then be reacted with hydrochloric acid to produce a magnesium chloride solution of exceptional purity, and such as is ideally adapted for use as an electrolysis cell feed for the recovery of magnesium metal in a high state of purity.

It has been discovered, in accordance with one aspect it is essential that a molar equivalent quantity of the magnesium values contained in the bitterns to the oxide, it s essential that a molar equivalent quantity of the chloride ion be present, due to the fact that magnesium chloride transforms on roasting to a magnesium oxide, while magnesium sulfate does not. Since normal solar evaporated bitterns do not contain this equivalence, it is necessary to provide additional chloride. This can most conveniently and cheaply be accomplished in accordance with the invention by the addition of sodium chloride, although potassium chloride can be used equally well. This addition simultaneously provides a cation for the sulfate freed from the magnesium sulfate and results in a soluble sodium and/or potassium sulfate.

Magnesium chloride in the presence of water vapor decomposes at modest temperature to form magnesium oxide and hydrochloric acid, in accordance with the reaction:

(1)  $MgCl_2 + H_2O \xrightarrow{heat} 2HCl + MgO$ 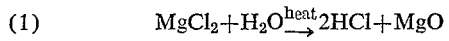

On the other hand, magnesium sulfate requires temperature approximating 1200° C. to effect decomposition.

The magnesium chloride bitterns produced by normal solar evaporation, usually contain neither sufficient chloride ion to allow conversion of all the magnesium to magnesium chloride, nor sufficient residual sodium and potassium ion combined to accommodate the sulfate content. The addition of either sodium or potassium chloride can correct these deficiencies simultaneously. Subsequent roasting of the mixture then results in conversion of all of the magnesium into the insoluble magnesium oxide, and leaves all of the sulfate as soluble salts of sodium, potassium, lithium, boron etc.

Reactive magnesium oxide hydrolyzes with water, in accordance with the reaction:

(2)  $MgO + H_2O \rightarrow Mg(OH)_2$ 

The magnesium hydroxide thus formed is a highly amorphous, slimy material, extremely difficult to wash, to filter, or to dewater. However, if the roast is conducted at a sufficiently high temperature, for example on the order of 600–700° C., the magnesium oxide thus produced is relatively unreactive. That is, it reacts but very slowly with water, if at all, and consequently it filters and washes well, allowing the soluble sulfates to be removed with comparative ease.

In accordance with the present invention, treatment of solar evaporated bitternsis accomplished in the following steps: sufficient sodium and/or potassium chloride is mixed with the bittern to provide sufficient chloride ion to balance the magnesium content and also to provide sufficient sodium and/or potassium ion to balance the sulfate content. Normally, a slight excess of the stoichiometric amount of the sodium and/or potassium chloride is added to assure complete reaction with the magnesium and sulfate values in the manner above stated. The mixture is then sprayed into a roaster maintained at about 600–700° C. Steam is injected into the roaster during the roast period. The hydrochloric acid evolved is recovered for use in a subsequent step of the process, as described below. The roaster calcinate is quenched with water and washed thoroughly. The insoluble residue is high purity magnesium oxide. The wash liquors contain sodium, potassium, lithium, boron, etc., as sulfates and may be further processed to recover these values particularly those of sodium and potassium. The washed magnesium oxide is recombined with the hydrochloric acid obtained as above, in accordance with the reaction:

(3) $\quad MgO + 2HCl \rightarrow MgCl_2 + H_2O$

A magnesium chloride solution of very high purity is thus obtained.

End bitterns from solar evaporated processes of sea water, Great Salt Lake brines, and other similar liquors are very nearly alike in composition. This comes about because, although the starting brines may vary widely in composition and the salts precipitated by the evaporation be of dissiimlar nature and composition, the phase chemistry involved directs the liquor compositions toward a substantially common compostion analysis.

Selected as typical of solar bitterns are the brine analyses set forth in the table below. Brine A is a normal bittern removed after salt harvesting, while Brine B is an example of a brine remaining after solar evaporation has been carried to the fullest economical extent. For illustrative purposes, trace elements have been eliminated from the analyses and the results normalized.

TABLE.—TYPICAL SOLAR BITTERNS

| | Brine A | | | Brine B | | |
|---|---|---|---|---|---|---|
| | Wt. percent | Mols per 1,000 mols H₂O | Deficiency, mols | Wt. percent | Mols per 1,000 mols H₂O | Deficiency, mols |
| Mg | 7.50 | 83.89 | | 8.48 | 96.67 | |
| K | 0.90 | 2.99 | 4.88 | 0.17 | 0.61 | 5.96 |
| Na | 0.90 | 3.53 | | 0.27 | 1.63 | |
| Cl | 20.70 | 79.01 | 4.88 | 23.25 | 90.72 | 5.95 |
| SO₄ | 4.00 | 11.40 | | 2.85 | 8.20 | |
| H₂O | 66.30 | 1,000.00 | | 64.98 | 1,000.00 | |
| Ratio mg./SO₄ | 1.875 | 7.359 | | 2.975 | 11.789 | |

For the basis shown in table, a quantity of Brine A containing 83.89 mols of magnesium would require the addition of 4.88 mols of sodium and/or potassium chloride, to balance the magnesium with the chloride and also the combined sodium and/or potassium with the sulfate. Similarly, for Brine B containing 96.67 mols of magnesium, the addition of 5.95 mols of sodium and/or potassium chloride is required to balance the magnesium and 5.96 mols to balance the sulfate.

Experimental investigation of the process according to the invention has established that in the roasting step the temperature is not critical, provided it is mainained sufficienly high, i.e., on the order of 500° C. or above to produce relatively unreactive magnesium oxide, and provided it is maintained sufficiently below the fusion temperature of the salt constituents to prevent fusion thereof, i.e., below about 800° C. The broad roaster temperature range according to the invention is about 500–750° C., the preferred temperature range being about 600–700° C. For injecting the salt solution into the roaster, a light spray or a heavy stream may be employed, this not being critical. The sodium and/or potassium chloride addition may range from the stoichiometric amount to about 100% in excess thereof for effecting the reactions above noted. The roasting time may range from about one to several hours.

The following examples are illustrative of specific embodiments of the invention:

EXAMPLE I

An evaporated, heavy brine, deficient in chloride equivalents with respect to magnesium content and having the following composition is selected:

| | Wt. percent | Mols per 1,000 mols H₂O |
|---|---|---|
| Ion: | | |
| Mg | 8.48 | 96.67 |
| Cl | 22.62 | 90.72 |
| SO₄ | 2.85 | 8.20 |
| K | 0.17 | 0.61 |
| Na | 0.27 | 1.63 |
| H₂O | 65.65 | 1,000.00 |

A total of 13,310 lbs. of the above brine is adjusted as to chloride content by the addition thereto of 500 lbs. of sodium chloride thereby to provide an excess of chloride ion. The mixture is then fed into a roaster equipped with mechanical rakes and maintained at a temperature of between 600–700° C. until hydrogen chloride evolution ceases. Steam is injected during the roasting operation. The evolved hydrogen chloride is collected and stored. The calcinate has the following composition:

Ion: Wt. percent
Mg _____ 39.55
Cl _____ 6.90
SO₄ _____ 12.16
K _____ 1.22
Na _____ 7.00

This calcinate is then ground through a 10 mesh screen, slurried in water with an additional 100 pounds of NaCl and reroasted until HCl evolution ceases, yielding a second calcinate having the following composition:

Ion: Wt. percent
Mg _____ 27.65
Cl _____ 4.83
SO₄ _____ 8.60
K _____ 1.21
Na _____ 5.55

The second calcinate is then taken up in water with agitation, washed, and filtered with the following results:

| | Filter cake | Filtrate, |
|---|---|---|
| Ion | Wt. percent | wt. percent |
| Mg | 53.63 | 0.05 |
| Cl | 0.21 | 0.14 |
| SO₄ | 1.26 | 5.38 |
| K | 0.70 | 0.15 |
| Na | 0.32 | 0.70 |

From the above, it will be noted that the washed and filtered magnesium oxide filter cake is substantially reduced in sulfate content over that of either the first or second calcinate. Further, that of the original 380 pounds of sulfate present in the brine, only 11.42 pounds is found in the magnesium oxide residue. Moreover, the comparatively low magnesium found in the filtrate and the very high magnesium sulfate ratio in the washed calcinate as compared to that of the original brine, emphasize the effectiveness of the removal. Similar results are obtained when no additional sodium chloride NaCl is supplied in the re-roast.

The highly pure magnesium oxide filter cake is next admixed, with stirring with concentrated hydrochloric acid, while maintaining a slight excess of the magnesium oxide. The resulting magnesium chloride solution is of a high degree of purity and is available for separation therefrom of pure magnesium chloride crystals.

EXAMPLE II

The general procedure of Example I is followed using the brine described therein except that after HCl ceases to evolve in the first roast, a slurry of water and 200 lbs. of NaCl is added to the roaster and roasting in the presence of steam is continued until HCl evolution ceases. The final roast is then one which is heavy in excess sodium chloride.

The following tabulation shows the composition of the calcinate before and after washing, and of the filtrate thus obtained in weight percent:

|  | Mg | Cl | SO₄ | K | Na |
|---|---|---|---|---|---|
| Calcinate: |  |  |  |  |  |
| Before wash | 29.2 | 14.5 | 11.24 | 1.12 | 12.39 |
| After wash | 55.31 | 1.32 | 1.61 | 0.08 | 0.22 |
| Filtrate | 0.21 | 5.63 | 4.35 | 0.54 | 5.38 |

EXAMPLE III

The general procedure of Example I is followed except that no re-roast of the first calcinate is performed. A brine having the following composition is employed:

Ion: Wt. percent
- Mg ---------------------------------- 8.41
- Cl ----------------------------------- 22.35
- SO₄ --------------------------------- 2.82
- K ------------------------------------ 0.34
- Na ---------------------------------- 0.25

A total of 13,220 lbs. of this brine containing 500 lbs. of added sodium chloride results in a calcinate weighing 2746 lbs. before water washing and 1769 lbs. after washing. The water washings after evaporation are found to contain 276 lbs. of the 375 lbs. of sulfate originally present in said brine.

What is claimed is:
1. The method for recovering magnesium oxide from a brine containing sulfate values and magnesium values in the presence of chloride ion and at least one alkali metal from the group consisting of sodium and potassium but which contains insufficient chloride ion to convert all the magnesium to magnesium chloride and insufficient alkali metal ions to balance the sulfate content, said method comprising adding to said brine an amount of alkali metal chloride from the group consisting of sodium chloride and potassium chloride and mixtures thereof sufficient to convert at least substantially all the magnesium to magnesium chloride and to balance at least substantially all the sulfate content, subjecting said brine to which the alkali metal chloride has been added to heat treatment in the presence of steam and at a temperature in the range from 500–750° C. to form thereby hydrogen chloride and a calcinate comprising magnesium oxide, and water soluble salts including sulfates of said alkali metal, intimately contacting said calcinate with large amounts of water relative to said calcinate to solubilize thereby substantial amounts of said soluble salts, and separating said magnesium oxide from said solubilized salts thereby to produce a high purity magnesium oxide with substantial elimination of said soluble salts and sulfate values.

2. The method according to claim 1, wherein the amount of chloride added to said brine is sufficient to provide at least a stoichiometric equivalent of chloride ion relative to the magnesium ion concentration.

3. The method according to claim 1 wherein said elevated temperature is sufficient to produce a magnesium oxide in said calcinate relatively unreactive with water.

4. The method according to claim 1 wherein said heat treatment is conducted at temperatures in the range of from about 600° C. to 700° C.

5. The method according to claim 1, wherein the first mentioned brine also contains at least one element from the group consisting of lithium and boron and said soluble salts include a salt of said element.

6. The method according to claim 1 wherein prior to contacting said calcinate with water, said calcinate is comminuted.

7. The method according to claim 1 wherein said separated magnesium oxide is treated with said hydrochloric acid to form thereby a high purity magnesium chloride.

8. The method according to claim 7 wherein prior to treatment of the magnesium oxide with hydrochloric acid said calcinate is again subjected to an elevated temperature heat treatment.

References Cited

UNITED STATES PATENTS

| 2,155,119 | 4/1939 | Ebner | 23—201X |
| 3,275,409 | 9/1966 | Schubert et al. | 23—201 |
| 3,432,031 | 3/1969 | Ferris | 23—121X |
| 3,432,258 | 3/1969 | Ferris | 23—201X |

OSCAR R. VERTIZ, Primary Examiner

G. ALVARO, Assistant Examiner

U.S. Cl. X.R.
23—91, 121